United States Patent [19]

Kobayashi et al.

[11] Patent Number: 4,517,244

[45] Date of Patent: May 14, 1985

[54] RECORDING MEDIUM AND INK JET RECORDING PAPER

[75] Inventors: Masatsune Kobayashi, Yokohama; Masahiro Haruta, Funabashi; Tsuyoshi Eida, Ichikawa; Tokuya Ohta, Yokohama, all of Japan

[73] Assignee: Canon Kabushiki Kaisha, Tokyo, Japan

[21] Appl. No.: 403,013

[22] Filed: Jul. 29, 1982

[30] Foreign Application Priority Data

Aug. 6, 1981 [JP] Japan ................................ 56-123320
Aug. 6, 1981 [JP] Japan ................................ 56-123321

[51] Int. Cl.$^3$ ...................... B41M 5/00; G01D 15/34; D21H 1/38; B32B 27/10

[52] U.S. Cl. .................................... 428/342; 162/134; 162/135

[58] Field of Search ............... 428/452, 514, 512, 537, 428/407, 342, 341, 206, 207, 211, 331, 330

[56] References Cited

U.S. PATENT DOCUMENTS

| | | | |
|---|---|---|---|
| 4,196,253 | 4/1980 | Spence | 428/512 X |
| 4,269,891 | 5/1981 | Minagawa | 428/335 |
| 4,335,184 | 6/1982 | Miyamoto et al. | 428/342 |
| 4,341,839 | 7/1982 | Shaw et al. | 428/512 X |
| 4,371,582 | 2/1983 | Sugiyama et al. | 428/537 X |

FOREIGN PATENT DOCUMENTS

| | | | |
|---|---|---|---|
| 74340 | 12/1977 | Japan . | |
| 0146786 | 11/1980 | Japan | 428/195 |
| 0000157 | 1/1981 | Japan . | |

*Primary Examiner*—Patricia C. Ives
*Attorney, Agent, or Firm*—Fitzpatrick, Cella, Harper & Scinto

[57] ABSTRACT

A recording material comprises a base material containing a highly water-absorptive resin and being in the form of a film.

15 Claims, No Drawings

RECORDING MEDIUM AND INK JET RECORDING PAPER

BACKGROUND OF THE INVENTION

1. Field of the Invention

This invention relates to a recording material on which a record is made with ink and, in particular, to a recording material adapted for ink jet recording (hereinafter, referred to as "recording paper").

2. Description of the Prior Art

What is called ink jet recording is a means of recording by producing droplets of a recording liquid called "ink" based on various principles of action and causing the droplets to adhere to desired recording paper or the like.

Due to its low noise and capability of high speed and multicolored recording, the ink jet recording method is making rapid progress in recent years.

Meanwhile, the ink jet recording is desired to satisfy in particular the following requirements:

(1) The recording paper quickly absorbs a recording liquid (ink).

(2) When ink dots overlap one another particularly in multicolored or full-colored recording, a later applied ink droplet neither deforms the formerly applied ink dot nor causes it to flow.

(3) The diameter of ink dot on recording paper does not become larger than necessary.

(4) Ink dots have a shape close to a circle and smooth perimeter lines.

(5) Ink dots have a high optical density and distinct perimeter lines.

(6) The recording paper has a high brightness and shows a good contrast with ink dots.

(7) The color of ink does not vary depending upon the type of the recording paper.

(8) Ink droplets scatter around ink dots to the minimum possible extent.

(9) The recording paper does not undergo a substantial dimensional change (e.g. elongation and wrinkling) by recording.

To meet these requirements depends on the characteristics of the recording paper used. However, no recording paper has been found until now that has characteristics satisfies all of these requirements.

For example, Japanese Pat. Laid-open No. 74340/1977 proposed a multicolored ink jet recording paper having a permeability (sec)/basis weight (g/m$^2$) of 0.3 or less and requiring a time of 2–60 seconds for absorbing 0.004 ml of water base ink. This recording paper is prepared by coating a base paper of about 40–80 g/m$^2$ in basis weight with an aqueous solution containing oxidized starch and poly (vinyl alcohol), and finishing it with a machine calender after drying. However, the proposed recording paper, though it is capable of absorbing ink rapidly, has disadvantages in that it is liable to extend the diameters of ink dots, gradate perimeters of ink dots, and undergo a significant dimensional change by recording.

SUMMARY OF THE INVENTION

The primary object of this invention is to overcome the difficulties that the prior art has not yet been able to solve in said technical field. In particular, the object is to provide a high performance recording paper capable of meeting almost all the above-mentioned requirements in recording with liquid ink by use of writing tools or the ink jet recording technique.

According to one object of the present invention, there is provided a recording material comprising a base material containing a highly water-absorptive resin and being in the form of a film.

According to another object of the present invention, there is provided a recording material comprising a base material layer containing a highly water-absorptive resin and a coating layer overlying said base material layer and also containing a dye-absorptive high polymeric binder as a main component.

DESCRIPTION OF THE PREFERRED EMBODIMENTS

The highly water-absorptive resin, as an important component in this invention, is a water-insoluble but water-absorptive high molecular compound having a water-absorbing capacity of 50–100 times its own weight.

Highly water-absorptive resins used in this invention, classified into categories, will be illustrated referring to the following Preparation Examples: Hereinafter, "parts" and "%" are by weight unless otherwise noted.

(A) Cellulose ethers made water-insoluble by partial crosslinking or modification.

PREPARATION EXAMPLE A-(1)

Product of Reaction of Cellulose Ether and N-Methylolacrylamide

Cellulose (100 g) was reacted with 46 g of 50% aqueous NaOH in 300 g of a water-containing isopropanol (87%) with through stirring at 20° C. for 45 minutes to form sodium cellulose. Succeedingly, 50 g of 48% aqueous N-methylolacrylamide solution was added to the reaction mixture and reacted with stirring at 50° C. for 1 hour, thereby modifying the sodium cellulose. Then, 55 g of sodium monochloroacetate (MCE-Na) was added and mixed therewith at 70° C. for 1 hour to etherify the modified reaction product. The resulting product was neutralized, washed and dried.

PREPARATION EXAMPLE A-(2)

Product of Reaction of Cellulose Ether and N-(Acrylamidemethylene)Acetamide This product was prepared in the same manner as in Preparation Example A-(1) except that a solution of N-(acrylamidemethylene)acetamide in a water-containing isobutyl alcohol (87%) was used for the modification treatment in place of the aqueous solution of N-methylolacrylamide.

PREPARATION EXAMPLE A-(3)

Product of Reaction of Cellulose Ether and N-(Acrylamidemethylene)Methylurethane This product was prepared in the same manner as in Preparation Example A-(2) except that N-(acrylamidemethylene)methylurethane was used for the modification treatment.

(B) Resins prepared by reactions of addition-polymerizable (double bond) monomers, water-soluble or becoming water-soluble on hydrolysis, with starch, cellulose, or amylose in the presence of a crosslinking agent, and if desired followed by hydrolysis of the resulting polymers.

PREPARATON EXAMPLE B-(1)

Product of Reaction of Corn Starch, Acrylamide, and Methylenebisacrylamide

Corn starch (70 parts), water (200 parts), and methanol (1200 parts) were charged in a reactor equipped with a stirrer, a nitrogen gas inlet tube, and a thermometer, and stirred at 55° C. for 1 hour under a stream of nitrogen gas. After cooling of the mixture to 30° C., 120 parts of acrylamide, 50 parts of an ammonium cerium (IV) nitrate solution (0.1 mole of cerium ions per liter of 1N nitric acid), and 0.1 part of methylenebisacrylamide were added and polymerized with stirring at 35° C. for 3 hours. The white, slightly viscous suspension thus obtained was filtered, and the separated solid was washed with a water-methanol mixture (weight ratio of water:methanol=2:10), dried in vacuo at 60° C. for 3 hours, and ground, thus giving 176 parts of a powdery product.

PREPARATION EXAMPLE B-(2)

Product of Reaction of Cellulose, Acrylic Acid, and N,N-Methylenebisacrylamide A mixture of 50 parts of fluff pulp (cellulose), 300 parts of water, and 900 parts of methanol was stirred in a reactor equipped with a stirrer, a nitrogen gas inlet tube, and a thermometer, at 55° C. for 1 hour under a stream of nitrogen. After cooling of the mixture to 30° C., 30 parts of acrylic acid 70 parts of sodium acrylate, 40 parts of an ammonium cerium (IV) nitrate solution (0.1 mole of cerium ions per liter of 1N nitric acid), and 0.5 part of N,N-methylenebisacrylamide were added and polymerized with stirring at 45° C. for 3 hours. The white suspension thus formed was filtered, and the separated solid was washed with a water-methanol mixture (weight ratio of water:methanol=2:10), dried in vacuo at 60° C. for 3 hours, and ground, giving 135 parts of a powdery product.

PREPRARATION EXAMPLE B-(3)

Product of Reaction of Potato Starch, Acrylamide, and N,N-Methylenebisacrylamide A mixture of 70 parts of potato starch, 200 parts of water, and 1200 parts of methanol was stirred in a reactor equipped with a stirrer, a nitrogen gas inlet tube, and a thermometer, at 55° C. for 1 hour under a stream of nitrogen. After cooling of the mixture to 30° C, 60 parts of acrylamide and 60 parts of ethyl acrylate together with 1.2 parts of ammonium persulfate, 0.1 part of sodium hydrogen sulfite, and 0.2 part of N,N-methylenebisacrylamide were added and polymerized with stirring at 30° C. for 5 hours. The white suspension thus formed was cooled, and after addition of 105 parts of 30% aqueous NaOH, was stirred at room temperature for 2 hours. The reaction mixture was then filtered, and the separated solid was washed with a water-methanol mixture (weight ratio of water:methanol=2:10), dried in vacuo at 60° C. for 3 hours, and ground, giving 195 parts of a powdery product.

(C) Resins prepared by reactions of monomers similar to those used in (B), with starch or cellulose in the presence of a crosslinking agent to crosslink it and if desired, followed by hydrolysis of the resulting polymers.

PREPARATION EXAMPLE C-(1)

Product of Reaction of Corn Starch and Methacrylic Acid

A mixture of 40 parts of corn starch and 800 parts of water was stirred at 80° C. for 1 hour under a stream of nitrogen in a reactor equipped with a stirrer, a gas inlet tube, and a thermometer, to form an aqueous solution of α-starch. After cooling the solution to 30° C., 120 parts of methacrylic acid with 60 parts of an ammonium cerium (IV) nitrate solution (0.1 mole of cerium ion per liter of 1N nitric acid) was added and polymerized at 30–40° C. for 3 hours with stirring. To the viscous translucent liquid thus formed were added 100 parts of 30% aqueous NaOH and then 1.0 part of ethylene glycol diglycidyl ether while stirring. The translucent liquid (1118 parts) formed thus was poured in a tray and dried at 100° C. for 3 hours under circulating air and further at 60° C. for 2 hours under reduced pressure to give a clear sheet of crosslinked resin. By grinding the resin, 198 parts of a white powder (waterabsorptive resin) was obtained.

PREPARATION EXAMPLE C-(2)

Product of Reaction of Rice Starch and Sulfopropyl Methacrylate

A mixture of 40 parts of rice starch and 800 parts of water was stirred at 70° C. for 1 hour under a stream of nitrogen in a reactor equipped with a stirrer, a gas inlet tube, and a thermometer. After cooling to 30° C. of the milky white starch dispersion thus formed, 160 parts of sulfopropyl methacrylate together with 1 part of sodium persulfate and 2 parts of sodium hydrogen sulfite was added and polymerized at 30–40° C. for 3 hours. To the viscous translucent liquid thus formed was added 2 parts of lead oxide to give a viscous translucent liquid, which was then poured in a tray and dried at 50° C. for 5 hours under reduce pressure to give a clear sheet of crosslinked resin. By grinding the resin, 155 parts of a white powder was obtained.

PREPARATION EXAMPLE C-(3)

Product of Reaction of Wheat Starch, Methacrylic Acid, and Sodium Acrylate

A mixture of 32 parts of wheat starch, 200 parts of methanol, and 600 parts of water was stirred at 40° C. for 1 hour under a stream of nitrogen in a reactor equipped with a stirrer, a gas inlet tube, and a thermometer. After cooling to 30° C. of the milky white dispersion of starch thus obtained, 1160 parts of sodium acrylate and 30 parts of methacrylic acid were added together with 1 part of 30% aqueous hydrogen peroxide and 0.5 part of L-ascorbic acid and polymerized at 30–40° C. for 3 hours with stirring. To the milky white suspension thus formed was added 2.0 parts of epichlorohydrin with stirring to give 988 parts of a milky white suspension, which was then poured in a tray, and after 3-hour heating at 50° C., it was dried at 100° C. for 2 hours under reduced pressure to give a clear sheet of crosslinked resin. By grinding it, 212 parts of a white powder (water-absorptive resin) was obtained.

(D) Resins prepared by reacting a crosslinking agent with saponified copolymers of a vinyl ester with ethylenic unsaturated carboxylic acids or derivatives thereof.

PREPARATION EXAMPLE D-(1)

Product of Reaction of Ethylene Glycol Diglycidyl Ether and Vinyl Acetate-Methyl Acrylate Copolymer A vinyl acetate-methyl acrylate copolymer (10 g) containing 62% by mole of the latter monomer units was dispersed by heating in 500 ml of methanol and saponified by adding 20 ml of 40% aqueous NaOH and heating at 60° C. for 20 hours. The saponification product was thoroughly washed with acetone to remove free NaOH and dried under reduced pressure to give a powder of saponified product sodium salt of the original copolymer. The saponification degree thereof determined from the alkali consumption was 90% by mole.

The sodium salt (10 g) was dissolved in 500 ml of water, and 0.1 g of ethylene glycol diglycidyl ether and 0.1 g of NaOH were added and reacted at 50° C. for 3 hours. The reaction product was coagulated with ethanol, ground in a mixer, and dried under reduce pressure.

PREPARATION EXAMPLE D-(2)

Product of Reaction of Vinyl Acetate-methyl Acrylate Copolymer and 1,6-Hexanediol Diglycidyl Ether Similarly to Preparation Example D-(1), a vinyl acetatemethyl acrylate copolymer containing 20% by mole of methyl acrylate was saponified to produce a sodium salt of the copolymer thus saponified having a saponification degree of 98%.

The saponified copolymer salt (10 g) was dissolved in 500 ml of water, and 0.3 g of 1,6-hexanediol diglycidyl ether and 0.1 g of NaOH were added and reacted at 50° C. for 1 hour.

The reaction product was then coagulated with ethanol, ground in a mixer, filtered, and dried, giving a granular product.

(E) Resins prepared by drying water-containing saponification products of copolymers of a vinyl ester with ethylenic unsaturated carboxylic acids or derivatives thereof.

PREPARATION EXAMPLE E-(1)

Sodium Salt of Vinyl Alcohol-acrylic Acid Copolymer

A vinyl acetate-methyl acrylate copolymer containing 43% by mole of the latter monomer units was obtained by polymerizing 0.8 mole of vinyl acetate and 0.2 mole of methyl acrylate in benzene at 80° C. for 2 hours in the presence of benzoyl peroxide. Then, 10 g of the copolymer was dissolved by heating in 500 ml of methanol and saponified by adding 20 ml of 40% aqueous NaOH and heating at 60° C. for 15 hours. The saponified product was thoroughly washed with acetone to remove free NaOH, and dried at 60° C. under reduced pressure for 20 hours, thus giving a powdery sodium salt of vinyl alcohol-acrylic acid copolymer. The saponification degree thereof determined from the alkali consumption was 93% by mole.

(F) Saponification products of crosslinkage-having copolymers of a vinyl ester with ethylenic unsaturated carboxylic acids or derivatives thereof.

PREPARATION EXAMPLE F-(1)

Saponification Product of Vinyl Acetate-methyl Acrylate Copolymer

Vinyl acetate (1 mole) and methyl acrylate (1 mole) together with a crosslinking agent, divinylbenzene, (0.01 mole were polymerized in benzene at 80° C. for 24 hours in the presence of benzoyl peroxide. The product was washed with ethanol, ground in a mixer, filtered, and dried to give a copolymer containing 56% by mole of methyl acrylate units. This copolymer was insoluble in either of methanol and acetone.

This copolymer powder (10 g) was dispersed in 300 ml of methanol and saponified by adding 30 ml of 40% aqueous NaOH and heating at 60° C. for 20 hours. The saponification degree of the product determined from the alkali consumption was about 95% by mole.

The copolymer thus saponified was thoroughly washed with methanol to remove free NaOH and was dried at 60° C. for 20 hours.

PREPARATION EXAMPLE F-(2)

Saponified Copolymer of Vinyl Acetate with Methyl Acrylate Prepared by Using Ethylene Glycol Diacrylate as Crosslinking Agent.

A vinylacetate-acrylic acid copolymer (1 mole) containing 25% by mole of the latter monomer units was dissolved in 500 ml of methanol. Ethylene glycol diacrylate (0.01 mole) as a crosslinking agent and azobisisobytyronitrile (0.02 mole) as a catalyst were added and reacted with the polymer at 60° C. for 3 hours. The reaction mixture was poured into a large amount of water to coagulate the resulting polymer, which was then ground in a mixer. The powdery crosslinked copolymer obtained was found to swell in methanol and in acetone but dissolve in none of them.

Then, 10 g of this powdery copolymer was swollen in 300 ml of methanol and saponified by adding 20 ml of 40% aqueous NaOH and heating at 60° C. for 3 hours. The saponification degree determined from the alkali consumption was about 90% by mole.

The saponified copolymer was thoroughly washed with methanol to remove free NaOH and dried at 60° C. for 20 hours under reduced pressure.

(G) Saponified copolymers of a vinyl ester with acrylic or methacrylic acid.

PREPARATION EXAMPLE G-(1)

Saponified Copolymer of Vinyl Acetate with Methyl Acrylate

Vinyl acetate (60 g) and methyl acrylate (40 g) together with a polymerization initiator, benzoyl peroxide, (0.5 g) were dispersed in water (300 ml) containing both a partially saponified poly (vinyl alcohol) (3 g) as a dispersion stabilizer and NaCl (10 g) and were suspension-polymerized at 65° C. for 6 hours. The copolymer thus obtained was found to contain 48% by mole of methyl acrylate units and exhibited an intrinsic viscosity of 2.10 in benzene at 30° C.

The copolymer (8.6 g) was suspended in a saponifying solution consisting of methanol (200 g), water (10 g), and 5N aqueous NaOH (40 ml) and saponified at 25° C. for 1 hour and further at 65° C. for 5 hours. The saponified product was thoroughly washed with methanol and dried in vacuo, giving 6.8 g of a dry saponified copolymer having spherical particle of 20–200 μm in size.

PREPARATION EXAMPLE G-(2)

Saponified Copolymer of Vinyl Acetate with Methyl Methacrylate

Staple fiber of 10 μm in diameter and 10 mm in length was obtained by cutting yarns spinned from an acetone solution of a vinyl acetate-methyl methacrylate copolymer containing 51% by mole of the latter monomer units and having an intrinsic viscosity of 1.95 in benzene at 30° C.

Said staple (8.6 g) was dispersed in a saponifying solution consisting of methanol (200 g), water (15 g), and 5N aqueous NaOH (40 ml) and was saponified at 25° C. for 1 hour and further at 65° C. for 5 hours.

The fiber thus saponified was thoroughly washed with methanol and dried in vacuo, giving 7.1 g of a fibrous saponified poduct.

(H) Self-crosslinked alkali metal acrylate polymers.

PREPARATION EXAMPLE H

A guaranteed reagent grade of n-hexane (228 ml) was placed in a 500 -ml four-necked, round-bottomed flask equipped with a stirrer, a reflux condenser, a dropping funnel, and a gas inlet tube. After 1.8 g of sorbitan monostearate was dissolved in the n-hexane, nitrogen gas was bubbled into the solution to expel the dissolved oxygen. On the other side, a solution of 13.4 g of 93% NaOH in 39 g of water was added to 30 g of acrylic acid in an Erlemeyer flask while cooling the outer wall of the flask, to neutralize 75% of the carboxylic groups of the acid, where the monomer concentration in the aqueous phase became 45%. Then, 0.1 g of potassium persulfate was added to dissolve in the solution and nitrogen gas was bubbled into the solution to remove the dissolve oxygen. The content in the Erlenmeyer flask was added to the solution in the four-necked flask to be dispersed therein and the mixture was stirred under a weak stream of nitrogen at 60°-65° C. for 6 hours. The resulting suspension was such that particles of the swollen polymer therein readily settle on stopping agitation. The n-hexane was distilled off under reduced pressure, and the residual swollen polymer was dried at 30°-80° C. under reduced pressure. The polymer obtained was a powder containing masses readily pulverizable with finger tip pressure.

(I) Crosslinked polyethylene oxide (J) Hydrolysate of starch-acrylonitrile graft copolymer (K) Poly (vinyl alcohol) esterified into sulfate or phosphate in the presence of a nitrogen-containing compound. For example, this type of polymer is prepared by dissolving a poly (vinyl alcohol) powder in dimethylformamide to a concentration of about 10%, adding dropwise sulfuric acid or phosphoric acid to this solution, and heating the mixture with stirring to esterify the poly (vinyl alcohol).

(L) Crosslinked poly (acrylic or methacrylic acid salt)

Of these highly water-absorptive resins, particularly preferred ones in this invention are polyelectrolytes having cationic or anionic groups in the molecule, including the above-cited (B), (C), (D), (E), (F), (G), (H), (J), (K).

Preferably, such polyelectrolytes having particle sizes in the range of from 0.02 to 100 μm are used in this invention.

The substrate containing a highly water-absorptive resin in this invention, generally means a recording paper made by forming into a sheet a dispersion of a highly water-absorptive resin in wood pulp.

Such recording paper can be readily obtained by applying a known paper-making process to a dispersion prepared by adding a fine powder of highly water-absorptive resin to wood pulp. Suitable amounts of the highly water-absorptive resin added to the pulp are 5-100 parts per 100 parts of the pulp, by weight. In this paper-making process, there can be incorporated into the paper stock a variety of additives, for example, fillers such as talc, clay, calcium hydrogencarbonate, silica, and barium sulfate; various surfactants; and preservatives.

Sizing agents can also be incorporated in small amounts although the use of large amounts thereof is undesirable because it detracts the effect of this invention.

The substrates of the recording paper in this invention are usually prepared by using wood pulp as mentioned above; however, they are not limited to this, but may also be nonwoven fabrics or plastics in a sheet form.

The dye-absorptive high polymeric binders for use in this invention are those having an ionic character opposite in polarity to that of a dye used in the recording ink. That is to say, when the ink comprises a direct dye or acid dye having at least one of —$SO_3M$ and —COOM (M represents an alkali metal or —$NH_4$; when M is hydrogen the groups are amine addition salts), in the molecule, a high polymeric binder having a cationic or acidic group is desirably used. On the contrary, when the ink comprises a basic dye having a quaternary ammonium salt group, a high polymeric binder having an anionic or basic group is desirable. The dye-absorptive high polymeric binders which can form the dye-absorptive surface layer of the recording paper of this invention include cationic polymers such as a quaternary ammonium type polymer, polyvinylpyridine, vinylidene chloridevinyl chloroacetate copolymer, polyvinylpyrrolidone, and cationic starch; acidic group-containing polymers such as poly (acrylic acid), poly (methacrylic acid), styrene-maleic acid copolymer, styrene-itaconic acid copolymer, methyl methacrylatemethacrylic acid copolymer, and methyl methacrylate-α-phenylacrylic acid copolyer; and such as anionic or basic groupcontaining polymers, poly (sodium acrylate), poly (sodium styrenesulfonate), polyamide resin, and polyacrylonitrile.

Other components which can be added to form the surface layer include a variety of additives, e.g., white or light-colored pigments such as clay, silica, calcuim hydrogen carbonate, titanium oxide, barium sulfate, talc, alumina, and satin white; various surfactants; and preservatives.

The above-mentioned components constructing the surface layer are mixed with water and/or at least one of various kinds of organic solvents using a well-known mixer such as a ball mill or sand mill to make up into a coating composition, which is applied onto a base paper in a coating weight (as solid) generally of 0.5-50 g/m$^2$ preferably, for practical use, 2-20 g/m$^2$, by a known coating method, e.g. roll coating or rod bar coating. The coating applied is dried in the ordinary way.

The ink used for recording on the recording paper of this invention contains water (a solvent) and a water-soluble dye (a colorant) as indispensable components. The water-soluble dye used is selected widely from known direct dyes, acid dyes, and basic dyes. Suitable contents of these colorants in the ink are 0.5-30%, preferably 1-20%, by weight. Solvents, other than water, used for the ink include water-miscible solvents such as glycols, e.g. glycerol, ethylene glycol, propylene glycol, diethylene glycol, and thiodiglycol; glycol ethers, e.g. methyl carbitol, ethyl carbitol, butyl carbitol, methyl Cellosolve, ethyl Cellosolve, triethylene glycol monomethyl ether, and triethylene glycol monoethylene ether; and nitrogen-containing solvents, e.g. N-methyl-2-pyrrolidone, 1,3-dimethyl-2-imidazolidinone, and formamide. Suitable contents of water in the ink are in the range of 10–90% by weight.

The recording paper of this invention, combined with the ink described above, gives the following favorable results:

(1) The absorption of solvent of the ink is so rapid that even overlapped ink dots do not blot and the fixation of ink dots is fast.

(2) While the absorption of solvent of the ink is rapid, the colorant dye is caught in the surface layer of the recording paper, so that an extremely high optical density of image can be obtained.

(3) Shapes of ink dots are close to a circle and the perimeter lines of ink dots are smooth so that sharp images excellent in resolution degree can be obtained.

This invention will be illustrated in more detail with reference to the following Examples:

EXAMPLES 1–10

A raw material pulp LBKP (100 parts by weight) was beaten in a refiner to a freeness (C.S.F.) of 400 ml, then each of a highly water-absorptive resins shown in Table 1, in a fine powder was admixed with the beaten pulp, and, therefrom, a paper of 80 g/m$^2$ in basis weight was prepared using a paper-making machine.

The recording paper samples thus prepared were subjected to ink jet recording tests by using the inks of which compositions are shown in Table 2. The results are shown in Table 3.

The optical densities of ink dots shown in Table 3 were measured by using a Sakura microdensitometer PDM-5 (mfd. by Konishiroku Photographic Industry Co., Ltd.) under conditions of slit size of 30 μm in width and 30 μm in height, driving speed of 10 μm/sec. in the direction of X axis, chart speed 1 mm/sec., and feed speed ratio of specimen to chart of 1:100. The diameter of dots were measured with an ordinary microscope. The fixation rate indicates the time required for applied inks to set to such an extent that rubbing of the ink dots with a finger does not stain the neighboring blank area on the printed paper specimens. The water resistances were evaluated by immersing printed paper specimens in water for 24 hours and observing the extent of blotting of printed images. In these Examples, an ink jetting nozzle diameter (orifice diameter) of 50 μm was used for ink jet recording.

TABLE 1

| Example No. | (note 1) Highly water-absorptive resin [trade mark] | (particle size) (maker) | Amount of the resin added (parts/100 parts of pulp, by wt) |
|---|---|---|---|
| 1 | B or C<br>Sanwet 1M-300 | 100 mesh<br>Sanyo Chem. | 20 |
| 2 | E<br>Sumikagel S-50 | 200 mesh<br>Sumitomo Chem. | 40 |
| 3 | L<br>Aquakeep 10SH | 50 mesh<br>Seitetsu Chem. | 30 |
| 4 | J<br>SGP-5028 | 100 mesh<br>Henkel Japan | 10 |
| 5 | K | 100 mesh | 15 |
| 6 | L<br>Aquakeep-4S | 50 mesh<br>Seitetsu Chem. | 15 |
| 7 | D | 100 mesh | 20 |
| 8 | E<br>Sumikagel S-50 | 250 mesh<br>Sumitomo Chem. | 30 |
| 9 | G | 200 mesh | 60 |
| 10 | B or C<br>Sanwet 1M-300 | 100 mesh<br>Sanyo Chem. | 10 |

Note 1:
Types of the resins are indicated by the foregoing symbols.

TABLE 2

| Example No. | Composition of ink (part by weight) Dye | | Solvent | |
|---|---|---|---|---|
| 1 | Kayarus Black G (C.I. 35255) | 5 | Water<br>Ethylene glycol | 80<br>15 |
| 2 | Direct Fast Black D (C.I. 27700) | 3 | Water<br>Glycerol | 90<br>7 |
| 3 | Spranol Milling Black VLG (C.I. 27070) | 2 | Water<br>Diethylene glycol | 70<br>28 |
| 4 | Acid Blue Black 10B (C.I. 20470) | 1 | Water<br>Ethylene glycol | 40<br>59 |
| 5 | Suminol Fast Black BR (C.I. 17580) | 5 | Water<br>Glycerol | 50<br>45 |
| 6 | Direct Fast Black conc. (C.I. 27720) | 3 | Water<br>Propylene glycol | 50<br>47 |
| 7 | Phloxine (C.I. 45410) | 4 | Water<br>Ethylene glycol | 60<br>36 |
| 8 | Aizen Cathilon Yellow 3GLH (C.I. 48055) | 5 | Water<br>Diethylene glycol | 70<br>25 |
| 9 | Malachite Green (C.I. 42000) | 3 | Water<br>Methyl Cellosolve | 30<br>67 |
| 10 | Aizen Cathilon Pink FGH (C.I. 48015) | 2 | Water<br>N—Methyl-2-pyrrolidone | 28<br>70 |

TABLE 3

| Example No. | Dot color density (OD) | Diameter of dot (μ) | Fixation time (sec) | Water resistance |
|---|---|---|---|---|
| 1 | 0.95 | 150 | 0.5 | No blotting |
| 2 | 1.05 | 130 | 0.6 | " |
| 3 | 0.95 | 140 | 0.3 | " |
| 4 | 0.75 | 140 | 0.4 | Slight blotting |
| 5 | 0.90 | 180 | 0.4 | " |
| 6 | 0.85 | 140 | 0.6 | No blotting |
| 7 | 1.10 | 130 | 0.8 | " |
| 8 | 1.10 | 140 | 1.2 | " |
| 9 | 0.70 | 200 | 0.8 | " |
| 10 | 0.85 | 160 | 0.9 | " |

EXAMPLES 11–20

One side surface of base paper samples of Examples 11–20 prepared by repeating the operations of Examples 1–10, respectively, were coated with the respective compositions, shown in Table 4, dispersed by using a ball mill, in the thickness of 5 g/m$^2$ in coating weight after drying.

Recording paper samples thus prepared were subjected to ink jet recording tests by using the respective ink compositions shown in Table 2. The results, measured in the same manner as in Examples 1–10, are shown in Table 5.

TABLE 4

| Example No. | Base Paper | Composition of coating for surface layer (part by wt.) Dye-absorbent | Solvent | Additive |
|---|---|---|---|---|
| 11 | Example 1 | Polyvinylpyridine 5 | Ethanol 95 | — |
| 12 | Example 2 | Poly (acrylic acid) 3 | Methanol 97 | — |
| 13 | Example 3 | Styrene-itaconic acid copolymer 10 | Methyl ethyl ketone 90 | — |
| 14 | Ex- | Styrene-maleic | Methyl ethyl | — |

TABLE 4-continued

| Example No. | Base Paper | Composition of coating for surface layer (part by wt.) Dye-absorbent | Solvent | Additive |
|---|---|---|---|---|
| | ample 4 | acid copolymer 12 | ketone 88 | |
| 15 | Example 5 | Cationic starch 5 | Water 95 | — |
| 16 | Example 6 | Styrene-vinyl-pyridine copolymer 8 | Methyl ethyl ketone 88 | Silica 4 |
| 17 | Example 7 | Quaternary ammonium salt type polymer GAFQUAT-755-(GAF) 6 | Water 84 | — |
| 18 | Example 8 | Polyacrylonitrile 4 | Acetonitrile 90 | Kaolin 6 |
| 19 | Example 9 | Poly (sodium acrylate) 15 | Water 80 | Clay 5 |
| 20 | Example 10 | Poly (sodium styrene-sulfonate) 5 | Water 95 | — |

TABLE 5

| Example No. | Dot color density (OD) | Diameter of dot (μ) | Fixation time (sec) | Water resistance |
|---|---|---|---|---|
| 11 | 1.00 | 130 | 0.5 | No blotting |
| 12 | 1.25 | 120 | 0.8 | " |
| 13 | 0.95 | 120 | 0.5 | " |
| 14 | 0.95 | 140 | 0.4 | " |
| 15 | 1.10 | 130 | 0.5 | " |
| 16 | 1.00 | 130 | 0.8 | " |
| 17 | 1.20 | 120 | 0.8 | Slight blotting |
| 18 | 1.25 | 120 | 1.2 | No blotting |
| 19 | 1.15 | 110 | 1.0 | " |
| 20 | 0.85 | 130 | 0.8 | " |

What we claim is:

1. A recording medium comprising a substrate material including a highly water-absorptive resin having a water-absorbing capacity of 50 to 1000 times its own weight.

2. A recording medium according to claim 1, wherein said highly water-absorptive resin is a polyelectrolyte having cationic or anionic groups in the molecule.

3. A recording medium according to claim 1, wherein said highly water-absorptive resin is a powder having particle sizes in the range 0.02 to 100 μm.

4. A recording medium according to claim 1, wherein said highly water-absorptive resin is contained in an amount of 5 to 100 parts per 100 parts of the substrate material, by weight.

5. A recording medium according to claim 1, wherein the substrate material is pulp.

6. A recording medium comprising: a substrate material layer including a highly water-absorptive resin and a coating layer overlying said substrate material layer and containing a dye-absorptive high polymeric binder as a main component; said water-absorptive resin having a water-absorbing capacity of 50 to 1000 times its own weight.

7. A recording medium according to claim 6, wherein said highly water-absorptive resin is a polyelectrolyte having cationic or anionic groups in the molecule.

8. A recording medium according to claim 6, wherein said highly water-absorptive resin is a powder having particle sizes in the range of from 0.02 to 100 μm.

9. A recording medium according to claim 6, wherein said highly water-absorptive resin is contained in an amount of 5 to 100 parts per 100 parts of the substrate material, by weight.

10. A recording medium according to claim 6, wherein the substrate material is pulp.

11. A recording medium according to claim 6, wherein said high polymeric binder is a cationic or anionic polymer.

12. A recording medium according to claim 6, wherein the coating layer contains a white or light-colored pigment.

13. A recording medium according to claim 6, wherein the coating weight of the coating layer is in the range of from 0.5 to 50 $g/m^2$.

14. An ink jet recording paper having enhanced fixation rates comprising: a support matrix having therein a water insoluble resin having a water absorbing capacity from 50 to 1000 times its own weight.

15. The paper of claim 14, wherein the weight ratio of resin to support is from 0.05:1 to 1:1.

* * * * *

UNITED STATES PATENT AND TRADEMARK OFFICE

CERTIFICATE OF CORRECTION

PATENT NO. : 4,517,244

DATED : May 14, 1985

INVENTOR(S) : MASATSUNE KOBAYASHI, ET AL.

It is certified that error appears in the above-identified patent and that said Letters Patent is hereby corrected as shown below:

Col. 1, line 47, before "satisfies" insert --that--.

Col. 2, line 19, change "100" to --1000--.

Col. 5, line 67, change "(0.01 mole were" to --(0.01 mole) were--.

Col. 9, line 25, before "using" insert --by--.

Signed and Sealed this

*Fourteenth* Day of *January 1986*

[SEAL]

*Attest:*

DONALD J. QUIGG

*Attesting Officer* *Commissioner of Patents and Trademarks*